United States Patent [19]
Chang et al.

[11] Patent Number: 5,442,719
[45] Date of Patent: Aug. 15, 1995

[54] ELECTRO-OPTIC WAVEGUIDES AND PHASE MODULATORS AND METHODS FOR MAKING THEM

[75] Inventors: Chin L. Chang, West Covina; Albert Choi, Agoura Hills; Sheri L. Douglas, Newbury Park, all of Calif.

[73] Assignee: Litton Systems, Inc., a Delaware corporation, Woodland Hills, Calif.

[21] Appl. No.: 95,278

[22] Filed: Jul. 21, 1993

[51] Int. Cl.$^6$ ............................................. G02B 6/10
[52] U.S. Cl. ................................. 385/3; 385/129; 385/14; 385/130; 385/132
[58] Field of Search ................ 385/1, 2, 3, 4, 8, 11, 385/14, 12, 141, 40, 50, 132, 129, 7, 130; 359/305, 326; 372/22; 356/350

[56] References Cited

U.S. PATENT DOCUMENTS

| | | | |
|---|---|---|---|
| 3,997,687 | 12/1976 | Phillips | 385/141 X |
| 4,607,909 | 8/1986 | Sanford | 385/8 |
| 4,705,346 | 11/1987 | Miyawaki | 385/130 |
| 4,778,234 | 10/1988 | Papuchon et al. | 385/11 X |
| 4,887,878 | 12/1989 | Robinson et al. | 385/2 |
| 4,984,861 | 1/1991 | Suchoski, Jr. et al. | 385/2 |
| 5,037,205 | 8/1991 | Pavlath | 356/350 |
| 5,191,624 | 3/1993 | Ito et al. | 385/7 |
| 5,193,136 | 3/1993 | Chang et al. | 385/14 |
| 5,267,336 | 11/1993 | Sriram et al. | 385/12 X |

*Primary Examiner*—Rodney B. Bovernick
*Assistant Examiner*—Phan T. H. Palmer

[57] ABSTRACT

Lithium niobate waveguides for light and lithium niobate channel waveguide electro-optic phase modulators for light include sufficient lithium ions such that, when an electrical signal of known value is applied to such waveguides and modulators, the phase of light passing through the waveguide or the modulator changes to a desired value within a time period that is substantially instantaneous.

14 Claims, 3 Drawing Sheets

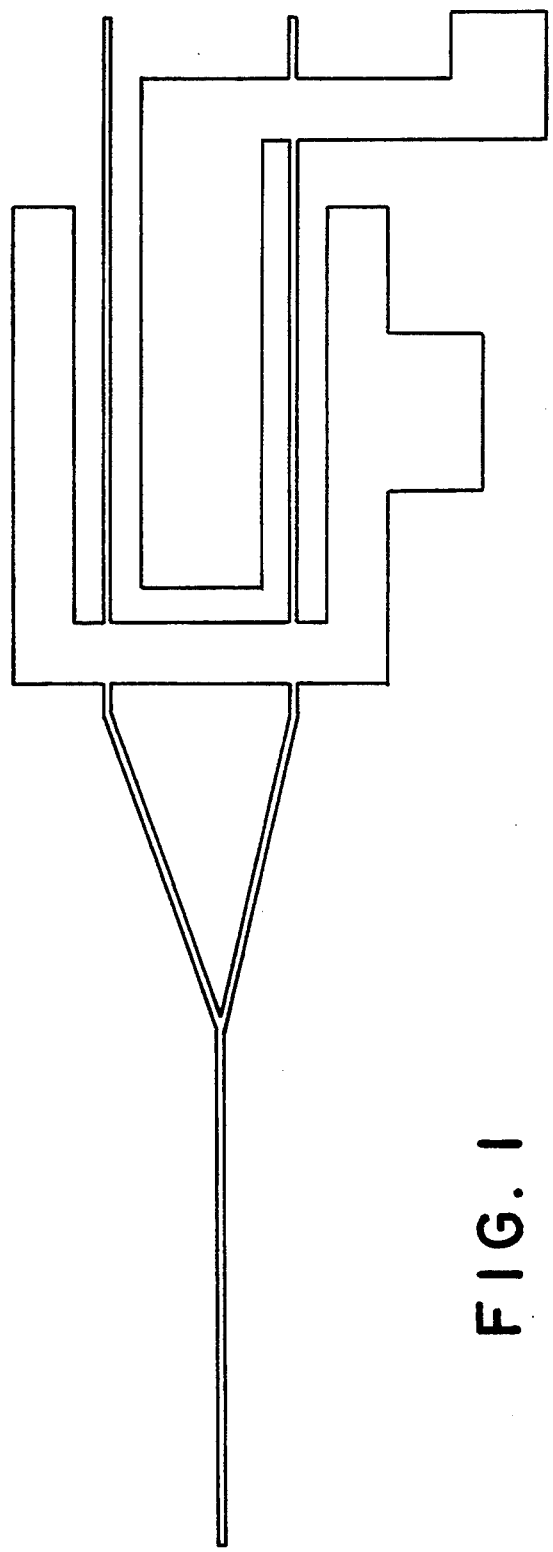
FIG. I

ELECTRO-OPTIC WAVEGUIDES AND PHASE MODULATORS AND METHODS FOR MAKING THEM

BACKGROUND OF THE INVENTION

1. Field of the Invention

This invention relates to lithium niobate optical waveguides and to channel waveguide electro-optic phase modulators that include sufficient lithium ions such that, when an electrical signal is applied to such a waveguide or modulator, the amplitude of light passing through the waveguide or modulator changes to a desired value substantially within the transient time of the applied electrical signal. This invention also relates to methods of making such optical waveguides and such channel waveguide electro-optic phase modulators.

2. Background of the Invention

Before now, the amplitude of light waves passing through lithium niobate optical waveguides, such as the waveguides used in fiberoptic gyros (FOG's), has failed to change substantially instantaneously to a desired value upon application of an electrical signal to the waveguide. Instead, the amplitudes of such light waves has tended to change gradually, requiring time periods of a few hundred microseconds or more to attain and maintain the desired value. This gradual change of amplitude is sometimes called phase relaxation, and seriously degrades the performance of FOG's containing them.

A need exists for methods for making optical waveguides and for making channel waveguide electro-optic phase modulators that exhibit substantially no phase relaxation and that can therefore improve the performance of FOG's containing them by at least one order of magnitude.

SUMMARY OF THE INVENTION

This invention relates to lithium niobate optical waveguides, and to lithium niobate channel waveguide electro-optic phase modulators which contain sufficient lithium ions such that the phase of a light signal passing through the waveguide or modulator changes substantially instantaneously to a desired value when a known electrical signal, such as a step function electrical signal, is applied to the modulator or waveguide. More particularly, the quantity of lithium ions in the waveguide or modulator is preferably sufficient to cause the phase of a light signal passing through the waveguide or phase modulator to change to a desired, steady-state value is not more than about one microsecond.

One method for making these waveguides and phase modulators comprises subjecting a lithium niobate waveguide, before the waveguide undergoes proton exchange and thermal annealing, to heat treatment in the presence of oxygen. This heat treatment preferably takes place at a temperature in the range of about 400° C. to about 1000° C., at about atmospheric pressure, in the presence of sufficient oxygen and of sufficient lithium niobate powder or other lithium ion source, and for a time period sufficient, to diffuse the needed quantity of lithium ions into the optical waveguide or phase modulator. The proton exchange and thermal annealing steps of this method are disclosed in U.S. Pat. No. 5,193,136, issued Mar. 9, 1993, and entitled *PROCESS FOR MAKING MULTIFUNCTION INTEGRATED OPTICS CHIPS HAVING HIGH ELECTRO-OPTIC COEFFICIENTS*. By this reference, the entire disclosure of that patent is incorporated herein by reference.

FIG. 3 shows a product having a hydrogen ion-exchange thermally annealed, Y-shaped polarizing waveguide formed on the surface of wafer 15. FIG. 3 also shows phase modulators, here electrodes, that are used to apply an electrical signal to the waveguide to change the phase of the light signal passing through the waveguide. FIG. 1 shows in schematic form the same relationship between waveguide 14 and phase modulating electrodes 15.

Alternatively, the waveguides and phase modulators may be made by treating lithium niobate wafers with an aqueous solution of benzoic acid and lithium benzoate, for a period of time in the range of about 0.5 to about 20 hours, at a temperature in the range of about 150° C. to about 300° C., and for a time sufficient to diffuse the desired quantity of lithium ions into the waveguide or phase modulator.

Another alternative method for making the waveguides and phase modulators is to subject lithium niobate wafers to proton exchange as described in U.S. Pat. 5,193,136, and then subjecting the proton exchanged-wafers to thermal annealing, as described in that patent, but in the presence of a lithium ion-rich environment, such as an environment comprising lithium niobate powder. The annealing step is carried out for substantially the same time periods and at substantially the same temperatures, in the presence of oxygen, as described in U.S. Pat. No. 5,193,136.

The waveguides and phase modulators of this invention may also contain titanium. To make such waveguides and modulators, titanium in-diffusion into the waveguides or the modulators is carried out in the presence of lithium niobate or another lithium ion source so that the waveguide or wafer is impregnated with titanium and lithium ions seriatim or substantially simultaneously.

BRIEF DESCRIPTION OF THE DRAWINGS

This invention can be better understood by reference to the drawings, in which:

FIG. 1 is a schematic representation of a multi-function integrated optics chip (MIOC) based on a lithium niobate substrate and including a channel waveguide electro-optic phase modulator made of lithium niobate and including sufficient lithium ions to minimize phase relaxation;

DESCRIPTION OF THE PREFERRED EMBODIMENTS

Figure 2A:
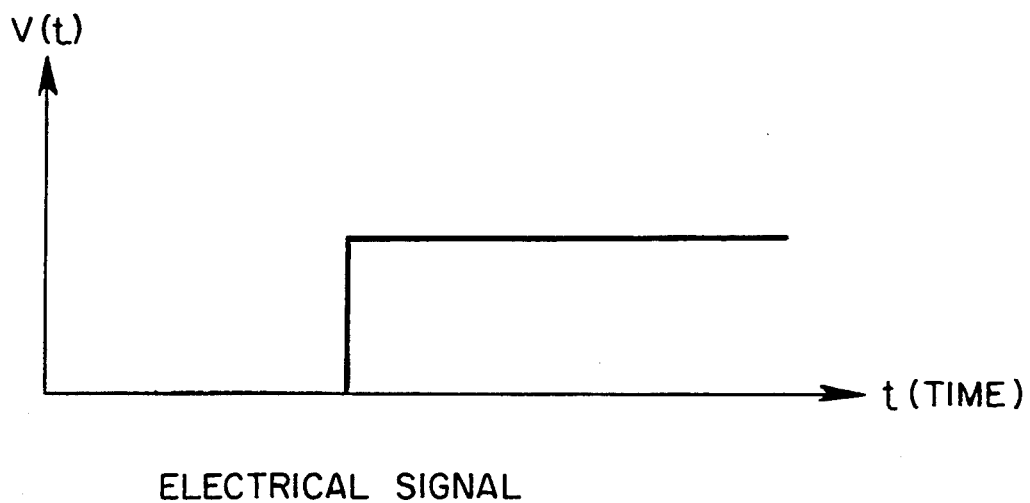
FIG. 2A is a graph showing a typical electrical step signal for application to a phase modulator of this invention.
Figure 2B:
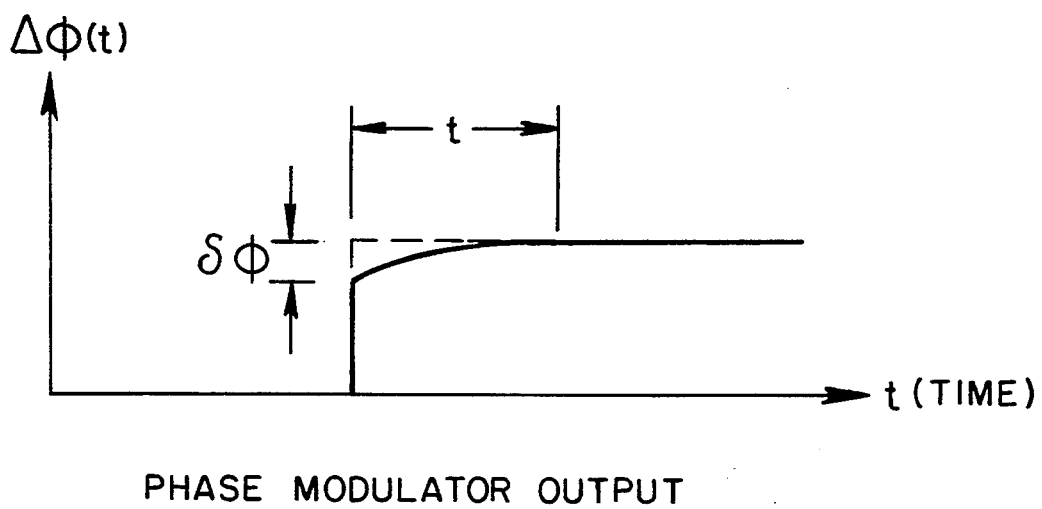
FIG. 2B shows the change in phase of the light waves passing through such a modulator.
Figure 3:
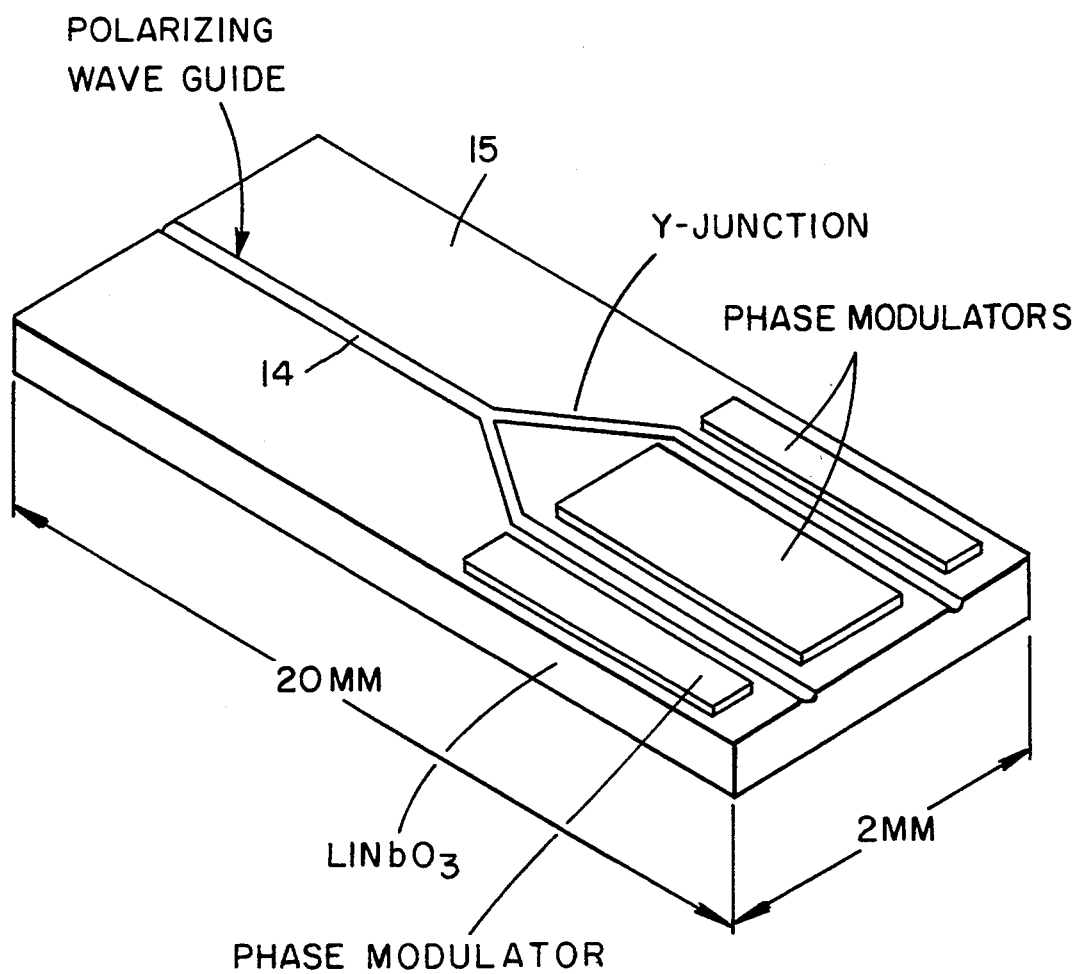
FIG. 3 shows embodiment of a product in accordance with the invention.

FIG. 1 shows a lithium niobate-based, multi-function integrated optics chip, in which the channel waveguide electro-optic phase modulator includes sufficient lithium ions such that, when an electrical signal as shown in FIG. 2A is applied to the waveguide, the phase modulator output amplitude conforms to the dotted line shown in FIG. 2B, rather than the solid line shown in FIG. 2B. As FIG. 2B shows, the phase of light passing through the waveguide changes substantially instantaneously, and, here, in a time period of less than about one microsecond, upon application of an electrical signal to the waveguide shown in FIG. 1.

The waveguide shown in FIG. 1 was made as follows. First, the lithium niobate wafer from which the waveguide was made was inserted into a closed chamber with lithium niobate powder. Oxygen was delivered to this chamber continuously at the rate of about 250 milliliters per hour. The temperature in the chamber was raised from ambient to about 1,050° C. incrementally at the rate of 20° C. per minute. After the temperature in the chamber rose to 1,050° C., the chamber was held at that temperature for about 7 hours. Thereafter, the chamber was opened, and the temperature was allowed to fall rapidly from 1,050° C. to 20° C. The wafer was then subjected to the proton exchange method described in U.S. Pat. No. 5,193,163 and the waveguide was made from the resulting wafer. Application of a step electrical signal to this waveguide showed a substantial reduction in the phase relaxation phenomenon.

In preferred embodiments, the method is as follows. A ceramic plate is cleaned with a solvent such as isopropyl alcohol, then dried with an inert gas such as nitrogen. Small pieces of lithium niobate are then placed on the plate. The lid of the plate is cleaned with a solvent such as isopropyl alcohol, and then dried, with an inert gas such as nitrogen. Thereafter, the lid is placed over the plate. The covered plate is placed in a furnace, heated to a temperature of about 1,050° C. in 20° C./minute increments, and then maintained at about 1,050° C. for about 7 hours. During the heating, oxygen is delivered into the chamber at the rate of about 250 milliliters per hour. Thereafter, the furnace is permitted to cool, the lid is removed, the lithium niobate wafer pieces are removed from the plate, and are then subjected to the proton exchange/annealing process as described in U. S. Pat. No. 5,193,136.

What is claimed is:

1. A system comprising a lithium niobate optical waveguide and, alongside said waveguide, an electrode positioned to apply an electrical signal to said waveguide, said waveguide including a sufficient quantity of lithium ions such that the phase of a light signal passing through said waveguide changes substantially instantaneously to a desired value when a known electrical signal is applied to said waveguide.

2. A lithium niobate channel waveguide electro-optic phase modulator having an electrode positioned alongside said modulator to apply an electrical signal to said modulator, said modulator including sufficient lithium ions such that the phase of a light signal passing through said modulator changes substantially instantaneously to a desired value when a known electrical signal is applied to said modulator.

3. The product of claim 1 or claim 2 further comprising titanium ions.

4. A fiberoptic gyro including a lithium niobate channel waveguide electro-optic phase modulator having an electrode positioned alongside said modulator to apply an electrical signal to said modulator, said modulator including a sufficient quantity of lithium ions such that the phase of a light signal passing through said modulator changes substantially instantaneously to a desired value when a known electrical signal is applied to said modulator.

5. A method comprising heating a lithium niobate optical waveguide or a channel waveguide electro-optic phase modulator at a temperature and for a time sufficient, and in the presence of oxygen and lithium ions, to produce a waveguide or a modulator including sufficient lithium ions such that the phase of a light signal passing through said optical waveguide or said channel waveguide electro-optic phase modulator changes substantially instantaneously to a desired value when a known electrical signal is applied to said waveguide or to said phase modulator.

6. The process of claim 5 wherein said heat treatment takes place at a temperature of approximately 1000° C.

7. A fiberoptic gyro system including a lithium niobate optical waveguide and, alongside said waveguide, an electrode positioned to apply an electrical signal to said waveguide, said waveguide including a sufficient quantity of lithium ions such that the phase of a light signal passing through said waveguide changes substantially instantaneously to a desired value when a known electrical signal is applied to said waveguide.

8. The fiberoptic gyro of claim 7 wherein said waveguide further comprises titanium ions.

9. A fiberoptic gyro including a lithium niobate channel waveguide electro-optic phase modulator having an electrode positioned alongside said modulator to apply an electrical signal to said modulator, said modulator including a sufficient quantity of lithium ions such that the phase of a light signal passing through said modulator changes substantially instantaneous to a desired steady state value in less than about 1 microsecond when an electrical signal is applied to said modulator.

10. The fiberoptic gyro of claim 4 or 9 wherein said phase modulator further comprises titanium ions.

11. A fiberoptic gyro system including a lithium niobate optical waveguide and, alongside said waveguide, an electrode positioned to apply an electrical signal to said waveguide, said waveguide including a sufficient quantity of lithium ions in said waveguide to cause the phase of a light signal passing through said waveguide to change substantially instantaneously to a desired steady state value in less than about 1 microsecond when an electrical signal is applied to said modulator.

12. The fiberoptic gyro of claim 11 wherein said waveguide further comprises titanium ions.

13. A lithium niobate channel waveguide electro-optic phase modulator having an electrode positioned alongside said modulator to apply an electrical signal to said modulator, said modulator including a sufficient quantity of lithium ions in said modulator to cause the phase of a light signal passing through said modulator to change substantially instantaneously to a desired steady state value in less than about 1 microsecond when an electrical signal is applied to said modulator.

14. A system comprising a lithium niobate optical waveguide and, alongside said waveguide, an electrode positioned to apply an electrical signal to said waveguide, said waveguide including a sufficient quantity of lithium ions in said waveguide to cause the phase of a light signal passing through said waveguide to change substantially instantaneously to a desired steady state value in less than about 1 microsecond when an electrical signal is applied to said modulator.

* * * * *